(12) United States Patent  
Muller (10) Patent No.: US 8,189,533 B2  
(45) Date of Patent: May 29, 2012

(54) CALCULATION OF A DESTINATION TIME ALIGNMENT VALUE TO BE USED BY A USER EQUIPMENT IN A DESTINATION CELL AFTER A HANDOVER

(75) Inventor: Walter Muller, Upplands Vasby (SE)

(73) Assignee: Telefonaktiebolaget L M Ericsson (publ) (SE)

( * ) Notice: Subject to any disclaimer, the term of this patent is extended or adjusted under 35 U.S.C. 154(b) by 619 days.

(21) Appl. No.: 12/305,344

(22) PCT Filed: Jun. 19, 2006

(86) PCT No.: PCT/SE2006/000739  
§ 371 (c)(1),  
(2), (4) Date: Dec. 17, 2008

(87) PCT Pub. No.: WO2007/149013  
PCT Pub. Date: Dec. 27, 2007

(65) Prior Publication Data  
US 2009/0290557 A1    Nov. 26, 2009

(51) Int. Cl.  
*H04W 4/00* (2009.01)

(52) U.S. Cl. ........ 370/331; 370/330; 370/332; 370/333; 455/436; 455/439; 455/442; 455/33

(58) Field of Classification Search .................. 370/331, 370/332, 333, 330; 455/436, 439, 442, 33.2  
See application file for complete search history.

(56) References Cited

U.S. PATENT DOCUMENTS 5,355,515 A    10/1994  Sicher  
5,722,080 A    2/1998   Kondo  
6,035,199 A    3/2000   Barnett  
(Continued)

FOREIGN PATENT DOCUMENTS

EP    1 463 367 A1    9/2004  
(Continued)

OTHER PUBLICATIONS

International Search Report dated Mar. 12, 2007 (3 pages).  
(Continued)

*Primary Examiner* — Jeffrey Pwu  
*Assistant Examiner* — Abdelnabi Musa  
(74) *Attorney, Agent, or Firm* — Myers Bigel Sibley & Sajovec, P.A.

(57) ABSTRACT

The invention relates to a method and arrangement for managing a calculation of a destination time alignment value TA2 to be used by a user equipment in a destination cell after a handover in a radio access network. The radio access network comprises a source cell, the destination cell and a user equipment which is adapted to switch to communicate with a destination base station comprised in the destination cell after the handover. The source cell is adapted to transmit a first reference signal and the destination cell is adapted to transmit a second reference signal. The method comprises the step of obtaining a first information comprising the time difference A between a point of time when the second reference signal is transmitted and a point of time when the destination cell receives the user equipment transmission, obtaining a second information comprising the time difference C between the point of time when second reference signal is received and a point of time when the user equipment transmission is transmitted, and calculating the destination time alignment TA2, by means of the formula [TA2=C−A].

18 Claims, 3 Drawing Sheets

U.S. PATENT DOCUMENTS

2004/0042431 A1* 3/2004 Ishikawa .................. 370/337
2007/0223537 A1* 9/2007 Crowle et al. ............. 370/503
2007/0286150 A1* 12/2007 Matsuoka et al. ......... 370/347

FOREIGN PATENT DOCUMENTS

| JP | 08-019039 A | 1/1996 |
| JP | 2004-527926 A | 9/2004 |
| WO | WO 01/15345 A1 | 3/2001 |
| WO | WO 02/31989 A2 | 4/2002 |

OTHER PUBLICATIONS

Written Opinion dated Mar. 12, 2007 (4 pages).
International Preliminary Report on Patentability and Written Opinion for PCT/SE2006/000739 mailed Mar. 12, 2007.
Crowle et al. "System for Determining Relative Time Alignment", U.S. Appl. No. 60/783,852, filed Mar. 21, 2006.
Japanese Office Action Corresponding to Japanese Patent Application No. 2009-516427; Dated: Nov. 4, 2011; 4 pages.

* cited by examiner

CALCULATION OF A DESTINATION TIME ALIGNMENT VALUE TO BE USED BY A USER EQUIPMENT IN A DESTINATION CELL AFTER A HANDOVER

TECHNICAL FIELD

The present invention relates to a method and an arrangement in a radio access network. In particular the present invention relates to managing calculation of a destination time alignment value to be used by a user equipment in a destination cell after a handover.

BACKGROUND OF THE INVENTION

Access schemes where user equipment transmissions need to be time aligned at the base station receiver require timing adjustments of the user equipment transmission to compensate for varying propagation delay between user equipments. This to avoid having to use unnecessary large time guard between users when having different and varying propagation delay between user equipments and base station. Basically all Time Division Multiple Access (TDMA) based access schemes such as Global System for Mobile communication (GSM), Personal Digital Cellular (PDC) and Time Division Multiple Access (TDMA) use some sort of time alignment control.

Time alignment adjustments of user equipments transmission are typically performed by using a reference signal as time reference, i.e. a base station transmitted time reference signal received in the user equipment, and order the user equipment to change the timing of the transmission in relation to the received time reference signal. The typical purpose of the time alignment adjustments is to avoid overlap between user equipments transmission at the base station receiver and make it possible to keep a fix time between reception and transmission to a certain user equipment in the base station.

Current time alignment solutions use shortened bursts, providing a large guard time at handover, avoid overlap in time between user equipment transmissions before timing adjustments have been made and also allows the base station receiver to measure the time adjustments required and also support for signaling that adjustment value to the user equipment before the user equipment starts to use normal bursts with no margin. Shortened bursts transmission and time alignment measurements are used at call setup and at handover. Shortened bursts are short enough to allow for enough time margins for the largest cells and may or may not contain user data payload. The shortened bursts used at setup may be different from the one used for handover. Normal bursts use as little time margin as possible given the frequency and accuracy of the time adjustments of the user equipment transmission.

Existing solutions requires shortened bursts transmission to be used initially by the user equipment when connecting to a new cell after handover and before the base station have adjusted the user equipment transmission in time. Shortened bursts imply shorter or longer interruption of the connection. The user equipment also depend on a good enough down link to measure on the reference signal and receive the time alignment order from the base station to stop the shortened burst transmission and start using normal bursts and normal power levels.

An alternative to use shortened bursts is described in U.S. Pat. No. 6,035,199. This document describes an apparatus and method for performing a handoff in wireless communication system. The method includes the steps of establishing communication between a mobile subscriber and a serving cell, determining whether a target cell and the serving cell are co-located, sending a normal burst handoff command to a mobile subscriber, sending a normal burst from the mobile subscriber to the target cell including a time offset, and establishing communication between the mobile subscriber and the target cell. The apparatus relates to a wireless system including a serving cell and a target cell in communication with a mobile subscriber. The mobile subscriber is sent a normal burst handoff, including an instruction to the mobile subscriber to transmit in normal bursts and to maintain current alignment, when the target cell overlaps the serving cell.

The problem with this solution is that it is limited to the case where the serving cell and target cells are co-located, i.e. using the same base station and/or the same antenna.

SUMMARY OF THE INVENTION

It is therefore an object of the present invention to provide a mechanism for timing of mobile transmission at handover that will work for any cell configuration both co-located and non-co-located cases.

According to a first aspect of the present invention, the object is achieved by a method for managing a calculation of a destination time alignment value to be used by a user equipment in a destination cell after a handover in a radio access network. The radio access network comprises a source cell the destination cell and the user equipment. The user equipment is adapted to communicate with a source radio base station comprised in the source cell. The user equipment is further adapted to switch to communicate with a destination radio base station comprised in the destination cell after the handover. The user equipment is further adapted to perform a user equipment transmission. The source cell is adapted to transmit a first reference signal and the destination cell is adapted to transmit a second reference signal. The method comprises the step of obtaining a first information from the destination cell. The first information comprises the time difference between a point of time when the second reference signal is transmitted by the destination cell and a point of time when the destination cell receives the user equipment transmission, which time difference is denoted A. The method comprises the further step of obtaining a second information comprising the time difference between the point of time when second reference signal is received by the user equipment and a point of time when the user equipment transmission is transmitted, which time difference is denoted C. The method comprises the further step of calculating the destination time alignment, denoted TA2, by means of the formula [TA2=C−A].

According to a second aspect of the present invention, the object is achieved by an arrangement in a network node in a radio access network. The radio access network comprises a source cell, a destination cell and a user equipment. The user equipment is adapted to communicate with a source radio base station comprised in the source cell. The user equipment is adapted to switch to communicate with a destination radio base station comprised in the destination cell after a handover from the source cell to the destination cell. The user equipment is adapted to perform a user equipment transmission. The source cell is adapted to transmit a first reference signal and the destination cell is adapted to transmit a second reference signal. The network node arrangement comprises an information obtaining unit, adapted to obtain a first information from the destination cell. The first information comprises the time difference between a point of time when the second reference signal is transmitted by the destination cell and a point of time when the destination cell receives the user equipment transmission, which time difference is denoted A. The information obtaining unit is further adapted to obtain a second information comprising the time difference between a point of time when second reference signal is received by the user equipment and a point of time when the user equipment transmission is transmitted, which time difference is denoted C. The network node arrangement further comprises an information processing unit, adapted to calculate a destination time alignment, denoted TA2, by means of the formula [TA2=C−A]. The destination time alignment is adapted to be used by the user equipment when communicating in the destination cell after the handover.

Since the time difference A between transmitting the second reference signal and receiving the user equipment transmission in the destination cell is obtained; and the time difference C between receiving the second reference signal and transmitting the user equipment transmission in the user equipment is obtained, the destination time alignment can be calculated while the user equipment is served by the source cell.

An advantage with the present invention is that usage of shortened bursts can be avoided at handover which implies that the handover interruption will be minimized.

A further advantage with the present invention is that minimized interruptions will also reduce the probability for triggering application back-off e.g. Transmission Control Protocol (TCP) back-off.

A further advantage with the present invention is that means to synchronize base stations with each other also are possible to provide.

DETAILED DESCRIPTION OF PREFERRED EMBODIMENTS

The invention is defined as a method and an arrangement which may be put into practice in the embodiments described below.

Figure 1:
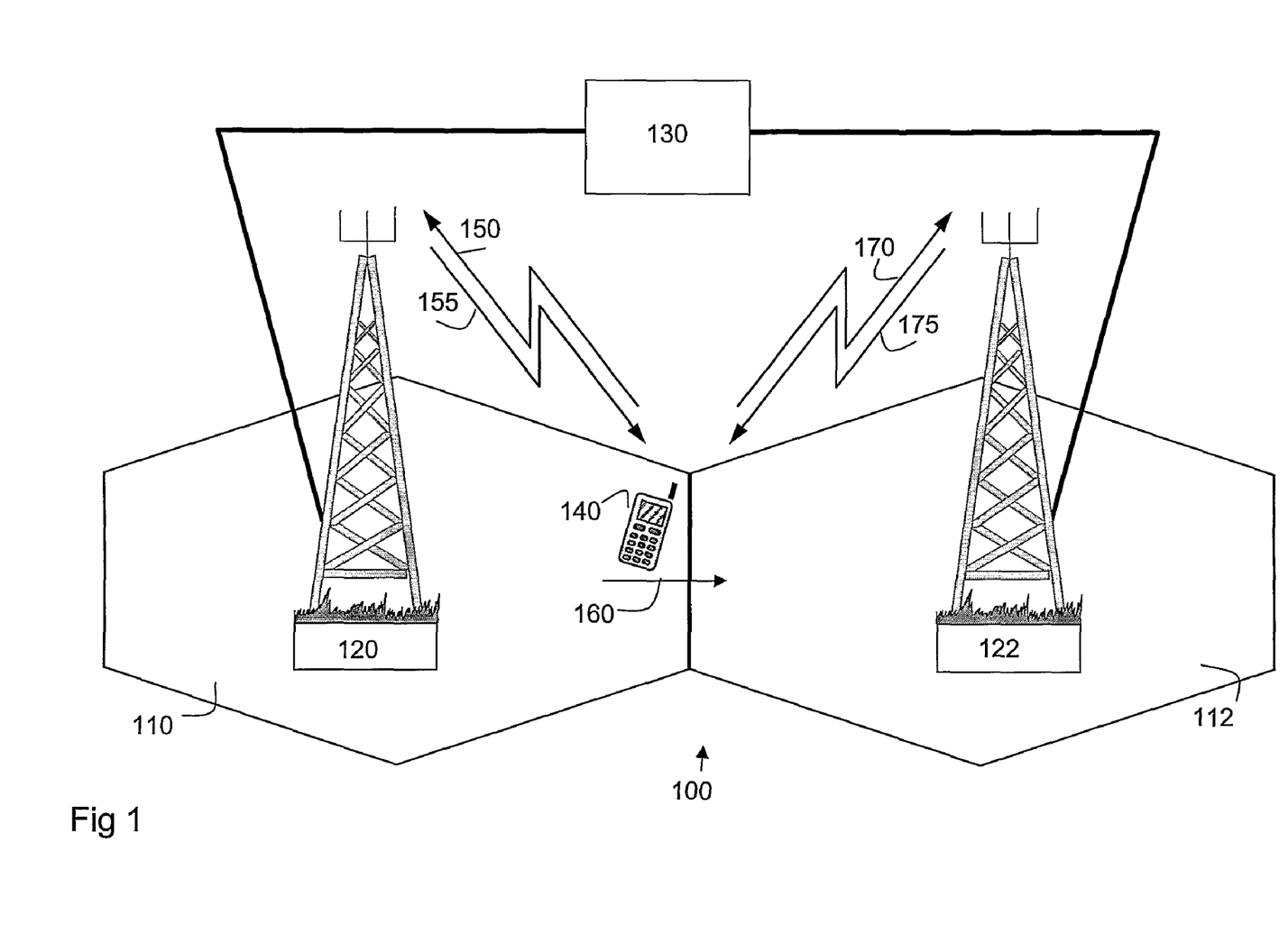
FIG. 1 is a schematic block diagram illustrating a radio access network.

FIG. 1 depicts a radio access network 100 using technologies such as e.g. Wideband Code Division Multiple Access (WCDMA), Time Division Duplex (TDD) mode Radio Access Network Long Term Evolution (RAN LTE), Global System for Mobile communication (GSM), Personal Digital Cellular (PDC), Worldwide Interoperability for Microwave Access (WIMAX) or any TDD or TDMA system. The radio access network 100 comprises a number of cells, whereof two cells, cell 110 and cell 112 are depicted in FIG. 1. Each of the cells is served by a radio base station such that cell 110 is served by radio base station 120 and cell 112 is served by radio base station 122. The cells 110, 112 and radio base stations 120, 122 are controlled by a network node 130, which network node 130 may be one or more network nodes that performs different controlling functionality, the network node may also be any radio base station. A user equipment 140 is currently positioned in cell 110. The cell 110 is from now on referred to as the source cell 110 and the radio base station 120 is from now on referred to as the source radio base station 120. The user equipment 140 may be a mobile phone, a Personal Digital Assistant (PDA), a Personal Computer (PC) card or any other node that is able to communicate in a radio access network. The user equipment 140 is currently communicating in the radio access network 100 via the source radio base station 120 on an uplink channel 150 and a downlink channel 155. The user equipment 140 is moving towards cell 112 which movement is pointed out by arrow 160. The cell 112 is from now on referred to as the destination cell 112 and the radio base station 122 serving the destination cell 112 is from now on referred to as the destination radio base station 122. The user equipment will make a handover, during which handover the user equipment 140 will switch from communicating via the source radio base station 120 to communicate via the destination radio base station 122 on an uplink channel 170 and a downlink channel 175.

The present method use the possibility of one or several candidates for destination cells to scan and receive the user equipment transmission while the user equipment is served by the source cell so that timing measurements can be performed in a network node or destination cell within the radio access network 100. The source cell 110, serving the user equipment 140 may control the user equipment transmission to make it feasible to measure and identify the user equipment 140 from destination cells. When a destination cell is chosen, time alignment information is calculated based on user equipment time difference measurements between source and destination cells and also on destination cell time difference measurements. This allows that no shortened bursts are used if the destination cell is able to receive the user equipment. Note that the source cell and destination cells may use different technologies such that e.g. the source cell may be a WCDMA cell and the destination cell can be a RAN LTE based cell as long as it is possible for the destination cell to measure on the user equipment.

In the following example, names and concepts from the ongoing RAN LTE work are used as an example, even though other technologies may be used as well.

Figure 2:
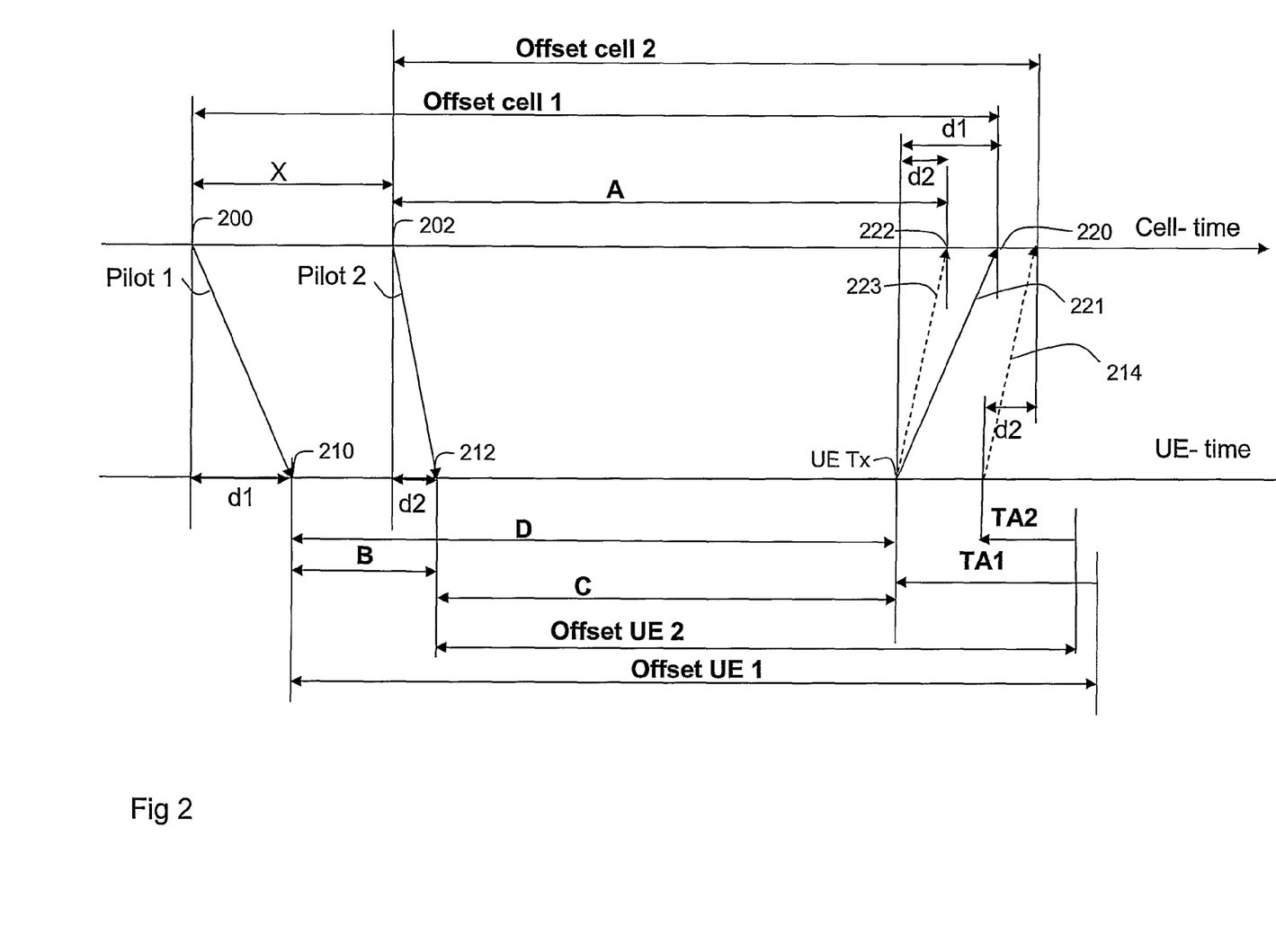
FIG. 2 is a schematic diagram illustrating time alignment.

The present method will now be described with reference to FIG. 2. FIG. 2 is a schematic diagram with two longitudinal axes, whereof the upper axis indicates time and is referred to the source cell 110 and the destination cell 112. The lower axis also indicates time but is referred to the user equipment 140. The user equipment 140 has to adjust its transmission to align with the destination radio base station 122 timing in the destination cell 112 at handover. It assumed that only one cell at a time control the user equipment 140 time alignment. In the case of RAN LTE the user equipment 140 is supposed to be able to adjust its transmission timing in relation to the timing of a received reference signal. Each of the cells 110 and 112 transmits a reference signal that the user equipment 140 can search for and receive if good enough signal quality exists. The source cell 110 transmits a first reference signal pointed out by the arrow denoted Pilot 1 in FIG. 2, at the point of time denoted 200. The destination cell 112 transmits as second reference signal pointed out by the arrow denoted Pilot 2 at the point of time denoted 202. The time difference between the point of time 200 when the reference signal Pilot 1 is sent from the source cell 110 and the point of time 202 when the reference signal Pilot 2 sent from destination cell 112 is denoted X in FIG. 2. How X can be calculated and what X may be used for will be described later on. Pilot 1, transmitted by the source cell 110, is received by the user equipment 140 at the point of time denoted 210 and Pilot 2 transmitted by the destination cell 112 is received by the user equipment 140 at the point of time denoted 212. The transmitted reference signals has time markers that allow the user equipment 140 to resolve the transmission times 200 and 202 of the reference signal when received. The propagation delay between the source cell 110 and the user equipment 140 is denoted d1 and the propagation delay between the destination cell 110 and the user equipment 140 is denoted d2. It is assumed that the uplink and downlink propagation delay is roughly equal.

The time alignment TA1 is the adjustment that is currently used by the user equipment 140 for communicating with the source radio base station 120 in the source cell 110. Before the handover, the user equipment 140 time alignment TA1 in the source cell 110 is monitored and adjusted by the source cell 110, where TA1=2*d1. The network node 130 is aware of the timing offset in the source cell 110, denoted offset cell 1 in FIG. 2 and the timing offset in the user equipment 140 when communicating in the source cell 110 denoted offset UE 1, which offset cell 1 is just as long as the offset UE1, i.e. [offset cell 1=offset UE1]. After handover, the timing offset in the destination cell 110 is denoted offset cell 2 in FIG. 2 and the timing offset in the user equipment 140 when communicating in the destination cell 110 is denoted offset UE 2, which offset cell 2 is just as long as the offset UE2, i.e. [offset cell 2=offset UE2]. In general the timing offset is equal in the source cell and destination cell, but they may also be different. The time alignment TA2 is the adjustment that requires to be used by the user equipment 140 for user transmission when communicating with the destination cell 112 after the handover, this destination cell user transmission is pointed out by arrow 214. The user equipment 140 time alignment TA2 will be monitored and adjusted by the destination cell 112 after the handover.

The network node 130 evaluates whether a cell handover is required or not. If required, the network node 130 orders the candidate destination cells, in the exemplary scenario in FIG. 1 the destination cell 112, to search for the user equipment 140 transmission. The user equipment transmission is transmitted at a specific time point denoted UE Tx. The user transmission, received in the source cell 110 at a point of time denoted 220, is pointed out by an arrow 221 and the user transmission received in the destination cell 112 at a point of time denoted 222 is pointed out by an arrow 223. The destination cell 112 reports back to the network node 130, the user equipment 140 reception quality and the time difference between the point of time 202 when transmitting the reference signal Pilot 2 and the point of time 222 when receiving the user equipment 140 transmission, which time difference is denoted A.

The user equipment 140 measures the time difference between the point of time 210 of the received first reference signal Pilot 1 and the point of time 212 of the received second reference signal Pilot 2, which time difference is denoted B. The time difference B may be reported to the network node 130 by the user equipment 140. The source cell 110 and the network node 130 has a good idea of the current time adjustment value TA1 used by the user equipment 140 in the source cell 110, the user equipment 140 may however report the actual current time adjustment value TA1 to the network node 130.

The user equipment 140 may also measure the time difference between the point of time 212 when second pilot 2 is received and the point of time when user equipment 140 transmission UE Tx is transmitted, which time difference is denoted C. The time difference C may be reported by the user equipment 140 to the network node 130 additionally or as an alternative to report the time difference B. C may also be calculated by using the formula [C=(offset UE1)−B−TA1] or since offset UE1=offset cell 1, by using the formula [C=(offset cell 1)−B−TA1].

In another embodiment, the user equipment 140 measures the time difference between a point of time 210 when the first reference signal Pilot 1 is received by the user equipment 140 and the point of time UE Tx when the user equipment transmission is performed, which time difference is denoted D and which time difference D may be reported to the network node 130. C may then be calculated by using the formula [C=D−B].

The TA2 value, to be used by the user equipment 140 when connecting to the chosen destination cell 112 after handover, is required before the handover to avoid the use of shortened burst and to thereby make the communication more effective, promptly when the communication starts to continue in the destination cell 112. When the network node 130 has obtained the time difference A from the destination cell and the time difference C from the user equipment or by being calculated, the time alignment TA2 can be calculated by means of the formula TA2=C−A. The calculation may be performed by the network node 130 or the radio base station 122 in the destination cell 112. When the calculation is performed the value of TA2 is reported to the user equipment 140 so that when the user equipment 140 continues the communication after handover to the destination cell 112, it prompt start the user equipment transmission using the calculated destination time alignment TA2 for adjustment of the point of time for transmitting the user equipment transmission.

If the chosen destination cell 112 can not receive the user equipment 140 well enough for doing reliable time measurements the network node 130 orders the user equipment 140 to use shortened bursts after the handover as fallback.

To synchronize base stations with each other in general and to synchronize the transmission from the source radio base station 120 with the transmission from the destination base station 122, the absolute time difference X between the point of time 200 when the reference signal Pilot 1 is sent from the source cell 110 and the point of time 202 when the reference signal Pilot 2 sent from destination cell 112 is required. This is calculated by using the formula X=B+(TA1−TA2)/2, wherein TA2 may be calculated as described above and B and TA1 is known. The time difference X may be calculated by the network node 130.

Figure 3:
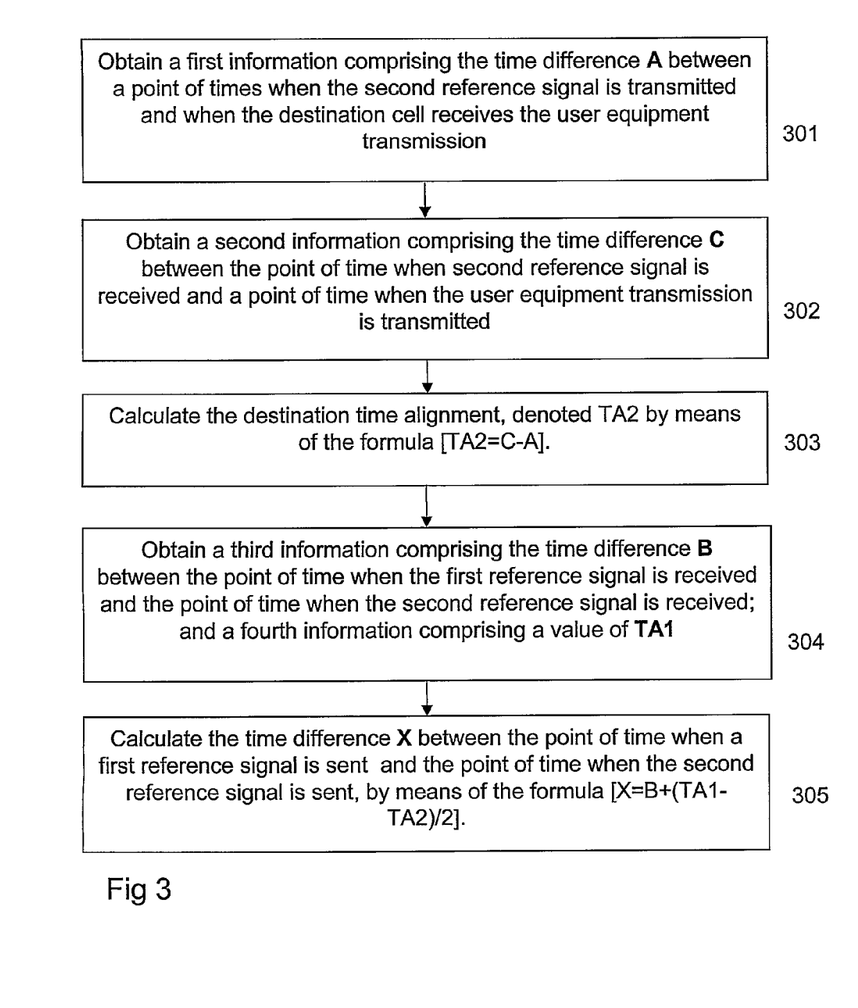
FIG. 3 is a flow chart illustrating a method for time alignment calculation.

The present method steps for managing a calculation of the destination time alignment value TA2 to be used in the destination cell 112 after a handover will now be described with reference to a flow chart depicted in FIG. 3.

301. A first information is obtained from the destination cell 112, the first information comprising the time difference between a point of time 202 when the second reference signal Pilot 2 is transmitted by the destination cell 112 and a point of time 222 when the destination cell 112 receives the user equipment 140 transmission, which time difference is denoted A.

302. A second information is obtained. The second information comprises the time difference between the point of time 212 when second reference signal pilot 2 is received by the user equipment 140 and a point of time UE Tx when the user equipment transmission is transmitted, which time difference is denoted C; The second information comprising the time difference C may be reported by the user equipment 140 to the network node 130.

In a second embodiment the time difference C is calculated based on a third, fourth and fifth information. In that case the third, fourth and fifth information is obtained. The third information comprises the time difference between the point of time 210 when the first reference signal Pilot 1 is received by the user equipment 140 and the point of time 212 when the second reference signal Pilot 2 is received by the user equipment 140, which time difference is denoted B. The fourth information comprises the value of TA1. The fifth information comprises the value of offset cell 1. The time difference C is then calculated by means of the formula [C=(offset cell 1)−B−TA1].

In a third embodiment the time difference C is calculated based on the third information and a sixth information. In that case the third and sixth information is obtained. The sixth information comprises the time difference between a point of time 210 when the first reference signal Pilot 1 is received by the user equipment 140 and the point of time UE Tx when the user equipment transmission is performed, which time difference is denoted D. The time difference C is then calculated by means of the formula [C=D−B].

303. When obtained the information comprising the time difference A and the time difference C, the destination time alignment, denoted TA2 is calculated by means of the formula [TA2=C−A].

304. If not obtained before, the third information comprising the time difference B and the fourth information comprising the value of TA1 are obtained.

305. The time difference between the point of time 200 when the first reference signal Pilot 1 is sent from the source cell 110 and the point of time 202 when the second reference signal Pilot 2 sent from destination cell 112, said time difference being denoted X, may then be calculated. The time difference X is calculated by means of the formula [X=B+(TA1−TA2)/2] and may be used for synchronizing the source and destination base stations 120 and 122.

Figure 4:
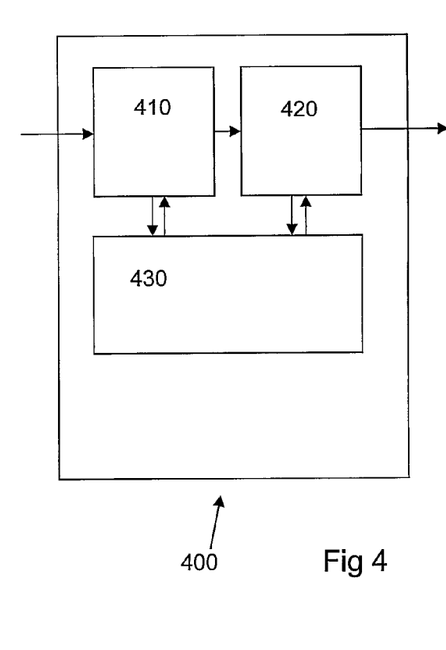
FIG. 4 is a schematic block diagram illustrating an arrangement in a network node within the radio access network.

To perform the present method steps, the network node 130 comprises an arrangement 400 as depicted in FIG. 4. The network node arrangement 400 comprises an information obtaining unit 410 adapted to obtain a first information from the destination cell 112, the first information comprising the time difference between a point of time 202 when the second reference signal Pilot 2 is transmitted by the destination cell 112 and a point of time 222 when the destination cell 112 receives the user equipment 140 transmission, which time difference is denoted A. The information obtaining unit 410 further is adapted to obtain a second information comprising the time difference between the point of time 212 when second reference signal pilot 2 is received by the user equipment 140 and a point of time UE Tx when the user equipment transmission is transmitted, which time difference is denoted C. The network node arrangement 400 further comprises an information processing unit 420 adapted to calculate a destination time alignment, denoted TA2, by means of the formula [TA2=C−A], said destination time alignment TA2 is adapted to be used by the user equipment 140 when communicating in the destination cell 112 after the handover.

The information obtaining unit 410 is further adapted to obtain a third information from the user equipment 140, the third information comprising the time difference between the point of time 210 when the first reference signal Pilot 1 is received by the user equipment 140 and the point of time 212 when the second reference signal Pilot 2 is received by the user equipment 140, which time difference is denoted B.

The user equipment 140 may be adapted to communicate with the source radio base station 120 using a source time alignment adjustment value denoted TA1. The information obtaining unit 410 may further be adapted to obtain a fourth information comprising the value of TA1.

The user equipment 140 may be adapted to communicate with the source radio base station 120 using a source timing offset denoted offset cell 1. The information obtaining unit 410 may be further adapted to obtain a fifth information comprising the value of offset cell 1. The information processing unit 420 may further be adapted to calculate C by means of the formula [C=(offset cell 1)−B−TA1].

The information obtaining unit 410 may further be adapted to obtain a sixth information from the user equipment 140, the sixth information comprising the time difference between a point of time 210 when the first reference signal Pilot 1 is received by the user equipment 140 and the point of time UE Tx when the user equipment transmission is performed, which time difference is denoted D. The information processing unit 420 may further be adapted to calculate C by using the formula [C=D−B].

The information processing unit 420 may further be adapted to calculate the time difference between the point of time 200 when the first reference signal Pilot 1 is sent from the source cell 110 and the point of time 202 when the second reference signal Pilot 2 is sent from destination cell 112, said time difference being denoted X, by means of the formula [X=B+(TA1−TA2)/2]. The network node arrangement (400) may be comprised in the destination radio base station (122).

The present time alignment calculation mechanism can be implemented through one or more processors, such as the processor 420 in the base station arrangement depicted in FIG. 4.

The present invention is not limited to the above-describe preferred embodiments. Various alternatives, modifications and equivalents may be used. Therefore, the above embodiments should not be taken as limiting the scope of the invention, which is defined by the appending claims.

The invention claimed is:

1. Method in a radio access network for managing a calculation of a destination time alignment value to be used by a user equipment in a destination cell after a handover, the radio access network comprising a source cell, the destination cell and the user equipment adapted to communicate with a source radio base station comprised in the source cell, the user equipment further being adapted to switch to communicate with a destination radio base station comprised in the destination cell after the handover, the user equipment further being adapted to perform a user equipment transmission, the source cell being adapted to transmit a first reference signal and the destination cell being adapted to transmit a second reference signal, the method comprising:

obtaining a first information from the destination cell, the first information comprising a time difference between a point of time when the second reference signal is transmitted by the destination cell and a point of time when the destination cell receives the user equipment transmission, which time difference is denoted A;

obtaining a second information comprising a time difference between a point of time when second reference signal is received by the user equipment and a point of time when the user equipment transmission is transmitted, which time difference is denoted C; and calculating the destination time alignment as a difference between the time difference A and the time difference C; and obtaining a third information from the user equipment, the third information comprising a time difference between a point of time when the first reference signal transmitted by the source cell is received by the user equipment and the point of time when the second reference signal transmitted by the destination cell is received by the user equipment, which time difference is denoted B.

2. Method according to claim 1, where the user equipment is to communicate with the source radio base station using a source time alignment adjustment value, denoted TA1, and where the method further comprises:
obtaining a fourth information comprising the value of TA1.

3. Method according to claim 2, where the user equipment is to communicate with the source radio base station using a source timing offset denoted offset cell 1, where the obtaining the second information C is performed by obtaining a fifth information comprising the value of offset cell 1, and calculating C as C=(offset cell 1)−B−TA1.

4. Method according to claim 1, where the obtaining the second information C is performed by:
obtaining a sixth information from the user equipment, the sixth information comprising a time difference between a point of time when the first reference signal transmitted by the source cell is received by the user equipment and the point of time when the user equipment transmission is performed, which time difference is denoted D,
calculating the second information C as a difference between the time difference D and the time difference B.

5. Method according to claim 2, the method further comprising:
calculating a time difference between a point of time when the first reference signal is transmitted from the source cell and the point of time when the second reference signal is transmitted from destination cell, said time difference being denoted X, where the time difference X is calculated as X=B+(TA1−TA2)/2.

6. Method according to claim 5, where the radio base stations within the radio network are synchronized by means of the calculated time difference X.

7. Method according to claim 1, where the method is performed in a network node within the radio communication network.

8. Method according to claim 1, where the method is performed in the destination radio base station within the radio communication network.

9. Arrangement in a network node in a radio access network, the radio access network comprising a source cell, a destination cell and a user equipment, the user equipment being adapted to communicate with a source radio base station comprised in the source cell, the user equipment further being adapted to switch to communicate with a destination radio base station comprised in the destination cell after a handover from the source cell to the destination cell, the user equipment further being adapted to perform a user equipment transmission, the source cell is adapted to transmit a first reference signal and the destination cell being adapted to transmit a second reference signal, the network node arrangement comprising:
an information obtaining processor unit of the network node, wherein the information obtaining unit is configured to obtain a first information from the destination cell, the first information comprising a time difference between a point of time when the second reference signal is transmitted by the destination cell and a point of time when the destination cell receives the user equipment transmission, which time difference is denoted A, wherein the information obtaining unit is further configured to obtain a second information comprising a time difference between a point of time when the second reference signal is received by the user equipment and a point of time when the user equipment transmission is transmitted, which time difference is denoted C; and
an information processor unit of the network node, wherein the information processing unit is configured to calculate a destination time alignment as a difference between the time difference A and the time difference C, wherein said destination time alignment is adapted to be used by the user equipment when communicating in the destination cell after the handover;
where the information obtaining processor unit is further configured to obtain a third information from the user equipment, the third information comprising a time difference between a point of time when the first reference signal is received by the user equipment and the point of time when the second reference signal is received by the user equipment, which time difference is denoted B.

10. The network node arrangement according to claim 9, where the user equipment is configured to communicate with the source radio base station using a source time alignment adjustment value, denoted TA1, where the information obtaining processor unit is further configured to obtain a fourth information comprising the value of TA1.

11. The network node arrangement according to claim 10, where the user equipment is configured to communicate with the source radio base station using a source timing offset, denoted offset cell 1, where the information obtaining processor unit is further to obtain a fifth information comprising the value of offset cell 1; and where the information processor unit is further to calculate C as C=(offset cell 1)−B−TA1.

12. The network node arrangement according to claim 9, where the information obtaining processor unit is further to obtain a sixth information from the user equipment, the sixth information comprising a time difference between a point of time when the first reference signal is received by the user equipment and the point of time when the user equipment transmission is performed, which time difference is denoted D; and where the information processor unit is further to calculate C as C=D−B.

13. The network node arrangement according to claim 10, where the information processor unit is further to calculate a time difference between a point of time when the first reference signal is sent from the source cell and the point of time when the second reference signal is sent from destination cell, said time difference being denoted X, the information processing unit calculating X as X=B+(TA1−TA2)/2.

14. The network node arrangement according to claim 9, where the network node arrangement is comprised in the destination radio base station.

15. Method according to claim 1 further comprising:
providing the destination time alignment TA2 to the user equipment for communication with the destination cell.

16. A method of operation in a radio access network to manage calculation of a destination time alignment value for a user terminal wherein the radio access network includes first and second radio base stations serving respective adjacent first and second radio base station cells and configured to transmit respective first and second reference signals, the method comprising:
providing communication service from the first base station for the user terminal;
while providing communication service from the first base station for the user terminal, obtaining a first time difference determined as a time between transmitting the second reference signal from the second base station and receiving a transmission from the user terminal at the second base station;
while providing communication service from the first base station for the user terminal, obtaining a second time difference determined as a time between receiving the second reference signal at the user terminal and transmitting the transmission from the user terminal;

calculating the destination time alignment as a difference between the first and second time differences; and providing the destination time alignment to the user terminal.

17. The method of claim 16 wherein providing the destination time alignment is provided to the user terminal for communication between the user terminal and the second radio base station.

18. The method of claim 17 further comprising:

after providing the destination time alignment to the user terminal, providing communication service from the second base station for the user terminal.

* * * * *

UNITED STATES PATENT AND TRADEMARK OFFICE
CERTIFICATE OF CORRECTION

PATENT NO. : 8,189,533 B2  
APPLICATION NO. : 12/305344  
DATED : May 29, 2012  
INVENTOR(S) : Müller Page 1 of 1

It is certified that error appears in the above-identified patent and that said Letters Patent is hereby corrected as shown below:

On the Face Page, in Field (12), under "United States Patent", in Column 1, Line 1, delete "Muller" and insert -- Müller --, therefor.

On the Face Page, in Field (75), under "Inventor", in Column 1, Line 1, delete "Walter Muller," and insert -- Walter Müller, --, therefor.

On the Face Page, in Field (75), under "Inventor", in Column 1, Line 1, delete "Vasby" and insert -- Väsby --, therefor.

On the Face Page, in Field (73), under "Assignee", in Column 1, Line 2, delete "(publ)" and insert -- (publ), Stockholm --, therefor.

In Column 6, Line 60, delete "C;" and insert -- C. --, therefor.

In Column 11, Line 7, in Claim 17, delete "claim 16" and insert -- claim 16, --, therefor.

Signed and Sealed this  
Eighteenth Day of December, 2012

David J. Kappos  
*Director of the United States Patent and Trademark Office*